United States Patent [19]
Schoenbauer

[11] Patent Number: 5,964,258
[45] Date of Patent: Oct. 12, 1999

[54] COOKING OIL SUPPLY AND DISPOSAL TRANSPORT SYSTEM

[75] Inventor: Bradley J. Schoenbauer, New Prague, Minn.

[73] Assignee: Restaurant Technologies, Inc., Burnsville, Minn.

[21] Appl. No.: 08/915,265

[22] Filed: Aug. 20, 1997

[51] Int. Cl.⁶ ..................................................... B65B 1/04
[52] U.S. Cl. ............................ 141/231; 141/83; 141/95; 141/98
[58] Field of Search ................................. 141/82, 95, 98, 141/231, 232, 233, 83; 222/1, 14, 608; 137/899.4, 360

[56] References Cited

U.S. PATENT DOCUMENTS

| | | |
|---|---|---|
| 3,735,693 | 5/1973 | Peister et al. . |
| 4,360,046 | 11/1982 | Streit et al. ................................. 141/82 |
| 4,485,831 | 12/1984 | Ungerleider .................................. 137/1 |
| 5,249,511 | 10/1993 | Shumate et al. ........................... 99/408 |
| 5,340,471 | 8/1994 | Wilson et al. ............................ 210/167 |
| 5,468,117 | 11/1995 | Lobko et al. ............................. 414/786 |

Primary Examiner—David J. Walczak
Assistant Examiner—Timothy L. Maust
Attorney, Agent, or Firm—Schwegmnan, Lundberg, Woessner & Kluth PA

[57] ABSTRACT

A bulk cooking oil supply and disposal transport system and method for the supply of cooking oil to and the removal of waste oil from a receiving facility. The system includes a transport vehicle with a supply and a waste oil container. An oil conduit system is connected with the supply and waste container to selectively deliver and remove oil through oil fittings. Pumps and valves are disposed within the oil conduit system for restricting the flow of the cooking oil therethrough. A first fluid meter measures the amount of cooking oil delivered to the receiving facility and a second fluid meter measures the amount of waste oil removed from the receiving facility. A control device receives signals indicating the level or amount of oil delivered or removed through the oil conduit system. Signals are generated by sensors at the receiving facility or from the fluid meters monitoring flow through the system. A data reporting device is provided on the vehicle to document the amount of cooking oil delivered to and the amount of waste oil received from the receiving facility.

13 Claims, 4 Drawing Sheets

COOKING OIL SUPPLY AND DISPOSAL TRANSPORT SYSTEM

FIELD OF THE INVENTION

The present invention relates generally to a system for handling cooking oil. More particularly, it pertains to a system and apparatus for supplying, disposing, and transporting cooking oil.

BACKGROUND OF THE INVENTION

Fast food restaurants have become quite common. These restaurants, as well as others, typically use large quantities of grease and/or cooking oil in fryers during the preparation of food. Given the large number of fast food restaurants and the quantity of cooking oil they require, supplying and removing cooking oil to and from these facilities has become a focus of many businesses. The cooking oil is typically shipped in containers, which are stored in a store room within the restaurant. The cooking oil containers occupy significant amounts of valuable space within the store room. The containers are manually carried to a fryer vat, lifted, and poured into the vat. Afterwards, the containers are disposed in the garbage.

Full containers of cooking oil can weigh as much as 35 to 50 pounds and therefore can be difficult to handle, particularly when the container must be carried from a storage area to a fryer. It is also difficult to lift the container and pour the contents into a fryer vat. Once the cooking oil has been poured in the fryer, the oil is often recycled a number of times through a filter before it is disposed. To dispose of the oil, the oil is drained from the fryer into a container carried manually to a disposal tank.

The disposal tank is located outside of the facility, for ease of access by a waste oil dealer, who picks up the waste oil from the disposal tank. The waste oil can then be recycled into other useful products. However, the location of the disposal tank provides a number of problems. The cooking oil, which is often at elevated temperatures, must be carried to the disposal tank. This exposes the worker who carries the cooking oil to the disposal tank to possible burns. In addition, rodents or other animals have access to the waste oil.

One solution to some of the above problems is addressed in U.S. Pat. No. 5,249,511 issued to Shumate et al. on Oct. 5, 1993. Shumate describes a bulk cooking oil distribution and waste removal system wherein a filter station, a waste station, a supply station and a flyer station are all connected by piping for movement of oil along preselected pipe paths. However, Shumate addresses the oil distribution within a restaurant, and does not address the oil delivery and removal to and from the facility using the bulk cooking oil.

Bulk delivery of oil can provide a cost effective way to furnish oil for a facility, such as a fast food restaurant. However, there are problems associated with providing bulk oil. For instance, it is difficult to accurately determine the amount of oil delivered or retrieved from a site, particularly if oil is deposited and removed during the same visit of the vehicle. The difficulties in accurately determining the amount of oil delivered or removed allows for theft of oil from the vehicle. Inaccuracies in delivery and/or retrieval amounts can lead to customer dissatisfaction as well, since a restaurant can be charged for more oil than what is actually delivered. Another problem associated with bulk delivery and retrieval is overfilling tanks. Filling tanks beyond their limit raises safety issues, such as cracked or exploding tanks, or unnecessarily creating slippery floor surfaces in the delivery vehicle or the restaurant.

Accordingly, what is needed is a way to cost effectively supply bulk cooking oil. What is further needed is a way to provide and remove cooking oil for cooking oil distribution and waste removal systems.

SUMMARY OF THE INVENTION

A bulk cooking oil transportation and delivery system is provided which allows for the supply and removal of cooking oil to and from a receiving facility. The oil transportation and delivery system comprises a transport vehicle with at least one cooking oil supply container mounted thereon. In one embodiment, a waste oil container is also provided on the transport vehicle. The supply and the waste container each comprises a tank which is secured to the transport vehicle.

An oil conduit system is connected with the supply container to selectively deliver oil from the cooking oil container to an oil delivery fitting. In addition, the conduit system is coupled with the waste oil container to deliver oil from an oil removal fitting to the waste oil container. At least one pump and/or at least one valve are disposed within the oil conduit system for restricting the flow of the cooking oil therethrough. In one embodiment, the oil conduit system also includes a control device which receives signals indicating the level or amount of oil delivered through the oil conduit system to the storage containers. The control device operates the pumps and valves in response to the signals received. Alternatively, the pump and valves are manually operated. In another embodiment, the control device includes a signal input to receive a signal from the receiving facility. In yet another embodiment, the receiving facility has a level sensor associated with oil storage containers at the facility. The level sensor delivers a signal to the control device when sufficient oil is in the storage containers, and the control device discontinues the flow of cooking oil through the oil conduit system.

First and second fluid meters are provided to measure the amount of supply oil delivered and the amount of waste oil removed. In another embodiment, the fluid meters are disposed within the fittings on the transport vehicle. The fluid meters deliver information to a printer—which can be mounted on the transport vehicle—regarding the amount of cooking oil delivered and the amount of waste oil removed.

In another embodiment, the oil receiving facility includes fittings coupled with storage containers. The fittings are accessible from external to the receiving facility and are adapted to couple with piping. The piping is coupled with fittings on the transport vehicle, which facilitates the delivery and removal of cooking oil to and from the oil receiving facility.

A method of handling and transporting bulk cooling oil is also provided. The method includes transporting cooking oil to the oil receiving facility with a transport vehicle, establishing a connection from the vehicle to a storage container at the facility by connecting a conduit to fittings provided at the vehicle and the oil receiving facility, pumping oil from the vehicle to the oil receiving facility, and measuring the amount of oil delivered with a first fluid meter. The method further includes the steps of establishing a connection from the vehicle to a waste storage container at the facility, pumping waste oil from the restaurant to the vehicle for recycling, and measuring the amount of waste oil removed with a second fluid meter. In another embodiment, the method further includes connecting a level sensing device with storage container and automatically discontinuing delivery of oil upon signal from the level sensing device.

Alternatively, in yet another embodiment, the method includes the step of printing a delivery report based on the amount of oil measured by the fluid meters.

The present invention beneficially provides a cost effective way to deliver and remove cooking oil to and from a receiving facility. The system assists in removing cooking oil without unnecessary spilling of the cooking oil, which can otherwise create an unsafe and unsanitary environment.

These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims.

DESCRIPTION OF THE EMBODIMENTS

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the spirit and scope of the present invention. Therefore, the following detailed description is not to be taken in a limiting sense, and the scope of the present invention is defined by the appended claims.

Figure 1:
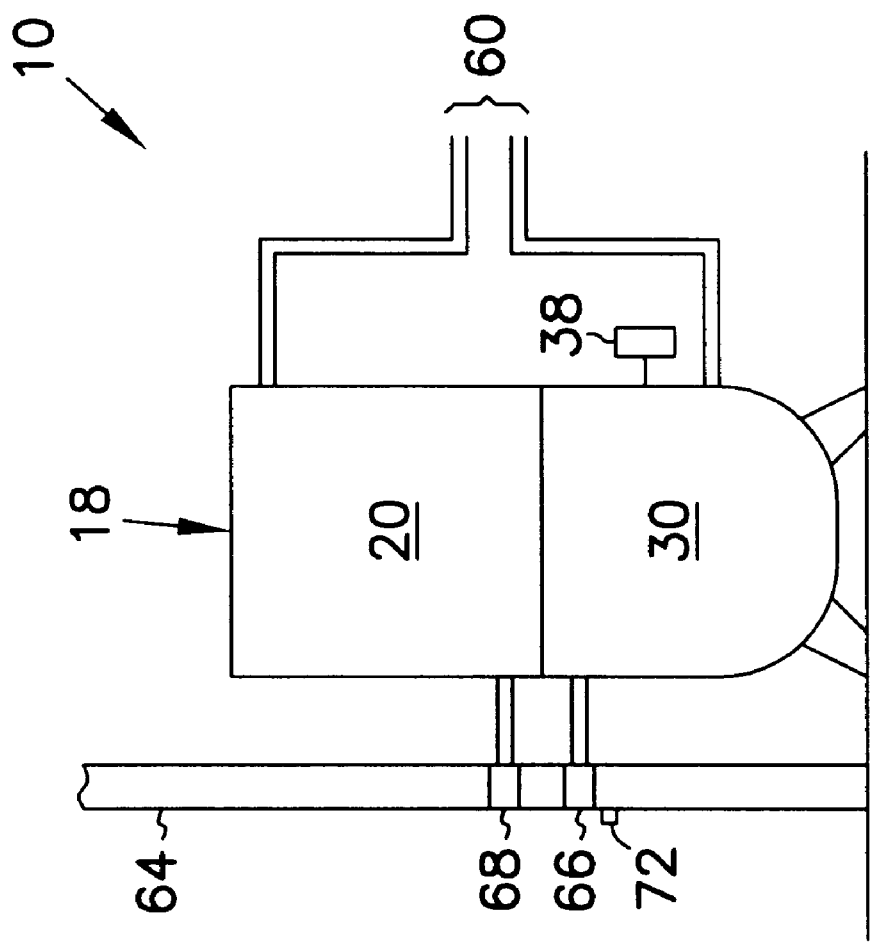
FIG. 1 is a block diagram illustrating a portion of a receiving facility constructed in accordance with one embodiment of the present invention.

The present invention provides a method and apparatus for supplying and removing cooking oil from an oil receiving location 10. Typically, the oil receiving location 10 will include a fast-food restaurant, although other locations or facilities could incorporate the present invention. The receiving location 10, as shown in FIG. 1, has a waste station 20 and a supply station 30. The function of the waste station 20 is to store waste cooking oil which has been degraded beyond appropriate further use in the cooking process. The function of the supply station 30 is to store fresh cooking oil and to provide fresh oil to fryers (not shown) for use in the cooking process. The waste station 20 and/or the supply station 30 comprise oil storage containers 18 which can take on a number of configurations, such as a tank. The storage containers 18 generally hold 100–150 gallons of cooking oil. However, containers holding other amounts of cooking oil are appropriate to use as well. The containers 18, which are connected with or adapted to be connected with the fryers, can be provided inside the receiving location 10. Alteratively, the containers 18 can be provided outside of the receiving location 10.

The supply station 30 at the receiving location 10 has a level sensor 38 associated therewith. The level sensor 38 detects the level of cooking oil within the supply station 30. In one embodiment, the level sensor 38 can monitor the level of oil within the container 18 from a location remote from the supply station 30. In another embodiment, the level sensor 38 is disposed within the supply station 30. Alternatively, the level sensor 38 is mounted within a sidewall of the supply station 30.

The level sensor 38 is operative to deliver a signal to a control device 140 on the transport vehicle 120 (FIG. 2), indicating the sufficient oil has been delivered to the container 18. One example of a level sensor is a liquid level float switch. However, other level sensors or other types of devices other than level sensors that monitor the amount of cooking oil disposed within the containers 18 are also suitable for use in the invention. Once a predetermined amount of oil is in the container, the level sensor 38 sends a signal to the control device 140. The control device 140, as will be discussed further below, is operative to discontinue delivery to the supply station 30 when the signal is received from the level sensor 38. Alternatively, the control device 140 sends a signal to the operator indicating when sufficient oil has been delivered to the supply station 30, and the operator manually turns off the pump and/or manually closes the valve.

As illustrated in FIG. 1, the waste station 20 and the supply station 30 are each coupled with a piping system 60 within the receiving location 10. The piping system 60 is also coupled with a location accessible from outside of the receiving facility 10.

For access to the supply station 30 and the waste station 20 from outside of the receiving facility 10, the facility 10 has an oil receiving fitting 66 for connection to receive cooking oil for storage in the supply station 30. An oil removal fitting 68 is also included for connection to remove cooking oil disposed in the waste station 20. In one embodiment, the oil receiving and removal fittings 66, 68 are disposed in an exterior wall 64 of the receiving location 10 such that access to the fittings 66, 68 from outside of the receiving location 10 is possible. One example of fittings 66, 68 is a quick coupler or a quick connect, which are known in the art.

In another embodiment, the oil removal fitting 68 and/or the oil receiving fitting 66 have a lock mechanism 72 associated therewith. The lock mechanism 72 restricts access to the waste stations 20 and the supply stations 30 to prevent unauthorized access or tampering to the cooking oil at the receiving location 10. In one embodiment, the lock mechanism 72 is a lock box which encloses the fittings 66, 68 therein. This beneficially reduces the risk of theft of cooking oil, and the risk of vandalism to the receiving facility.

Figure 2:
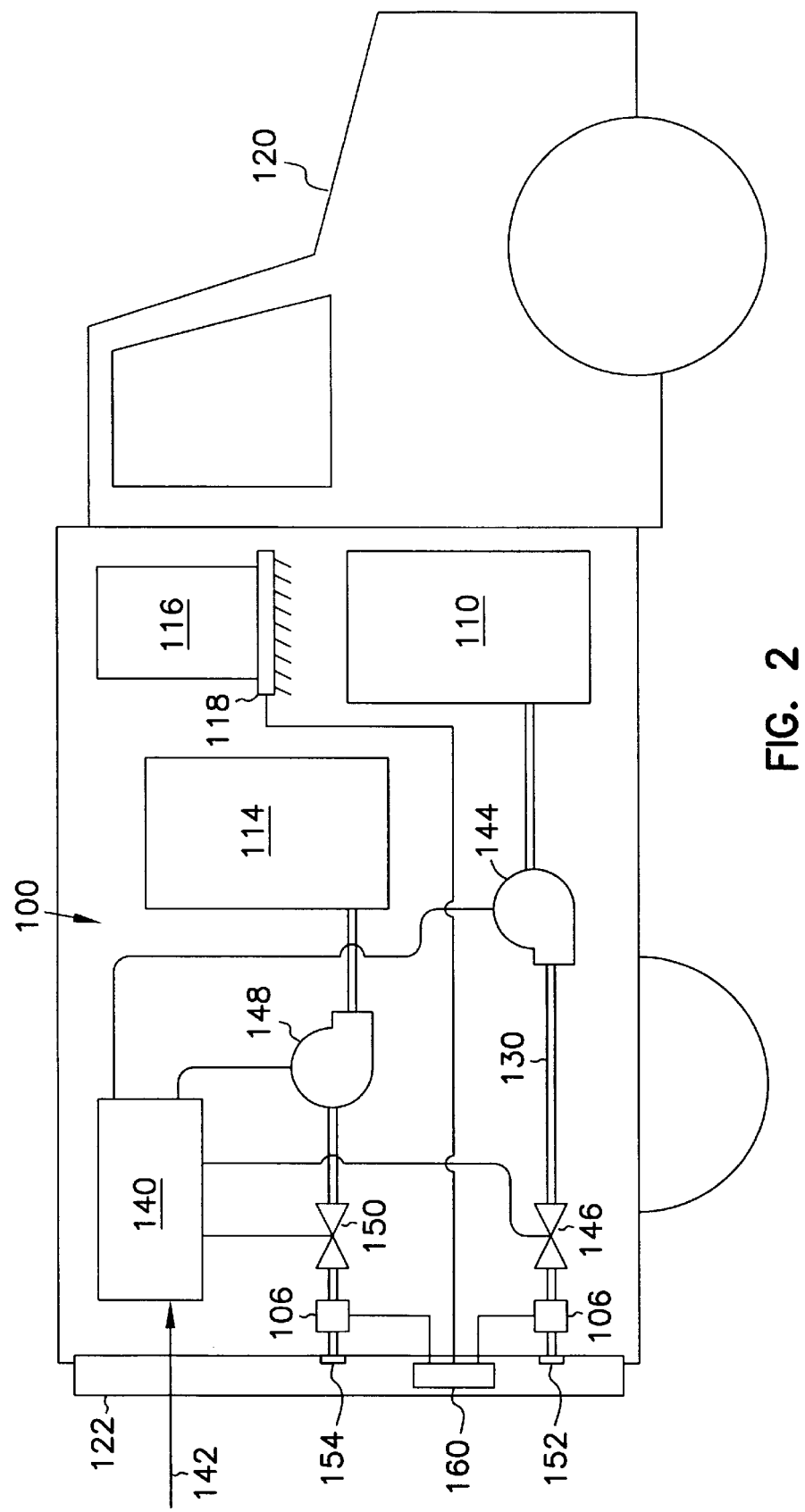
FIG. 2 is a block diagram illustrating a portion of a transport vehicle constructed in accordance with one embodiment of the present invention.

As shown in FIG. 2, a cooking oil supply and transport system 100 includes a cooking oil supply container 110 and a waste oil container 114. Each supply container 110 and each waste container 114 is a tank, or a plurality of tanks. In one embodiment, the containers 110, 114 have straps disposed around the circumference of each container and are removably coupled to a portion of the transport vehicle 120. Alternatively, the containers 110, 114 are permanently secured to the transport vehicle. In another embodiment, the containers 110, 114 are preassembled on a flat which is then coupled with the transport vehicle 120. The containers 110, 114 are generally cylindrical in shape, and are mounted in a vertical direction. Alternatively, the containers 110, 114 can have other constructions, and mounted in other configurations, such as a horizontal mounting. Each container is comprised of a substantially rigid material such as a plastic or metal material. The containers 110, 114 are adapted to be mounted on a transport vehicle 120. The transport vehicle comprises a delivery truck, a trailer coupled with a vehicle, or other delivery vehicles.

An oil conduit system 130 is provided on the transport vehicle 120, which is connected to selectively deliver oil from the cooking oil supply container 110 to the receiving location 10. The conduit system 130 facilitates the transportation of cooking oil, and consists of a combination of pipe and flexible tubing. Alternatively, the conduit system 130 consists of all pipe or all flexible tubing. The oil conduit system 130 is coupled with the cooking oil supply container 110 and the waste oil container 114. Disposed within the oil conduit system 130 are a delivery pump 144, a delivery valve 146, a removal pump 148, and a removal valve 150, as will be further discussed below.

Figure 3:
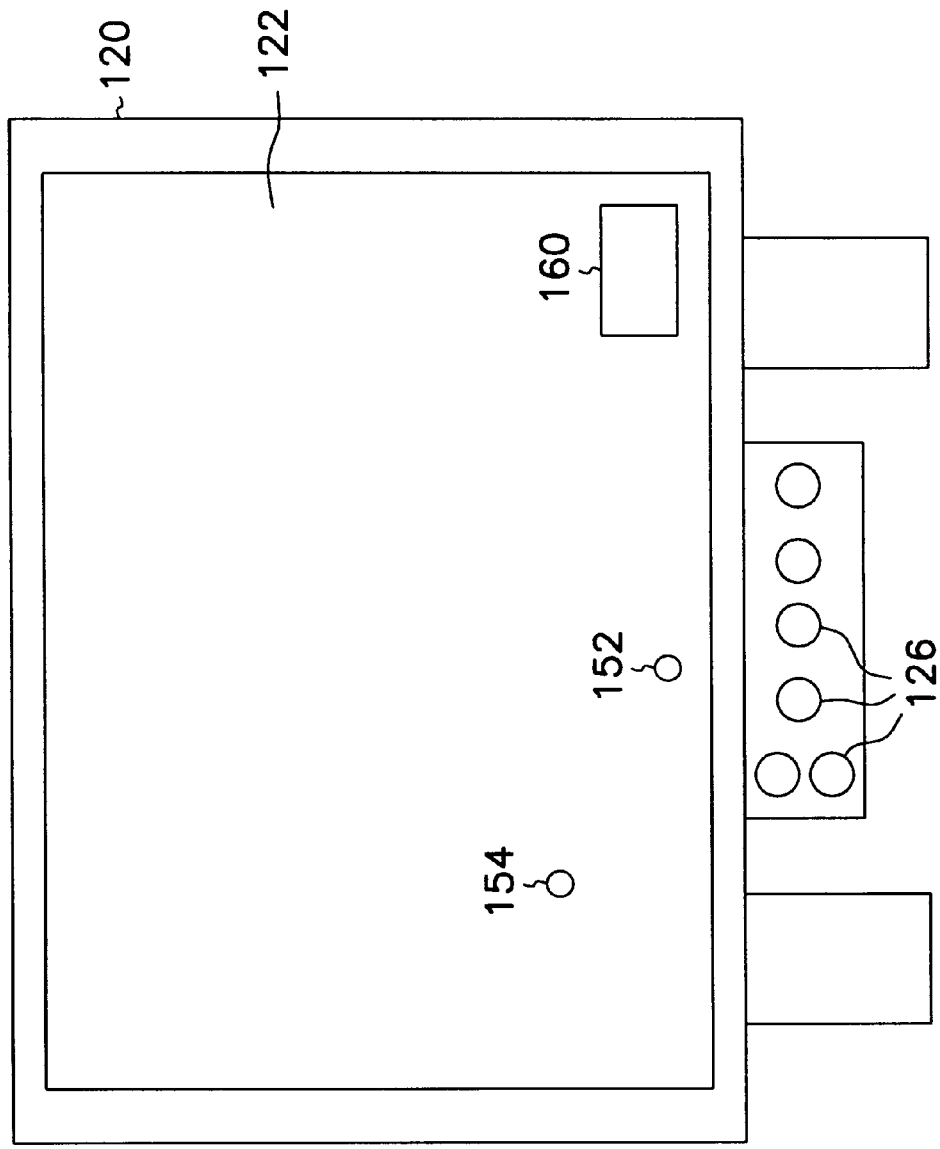
FIG. 3 is an elevational view illustrating an interface panel of a transport vehicle constructed in accordance with another embodiment of the present invention.
Figure 4:
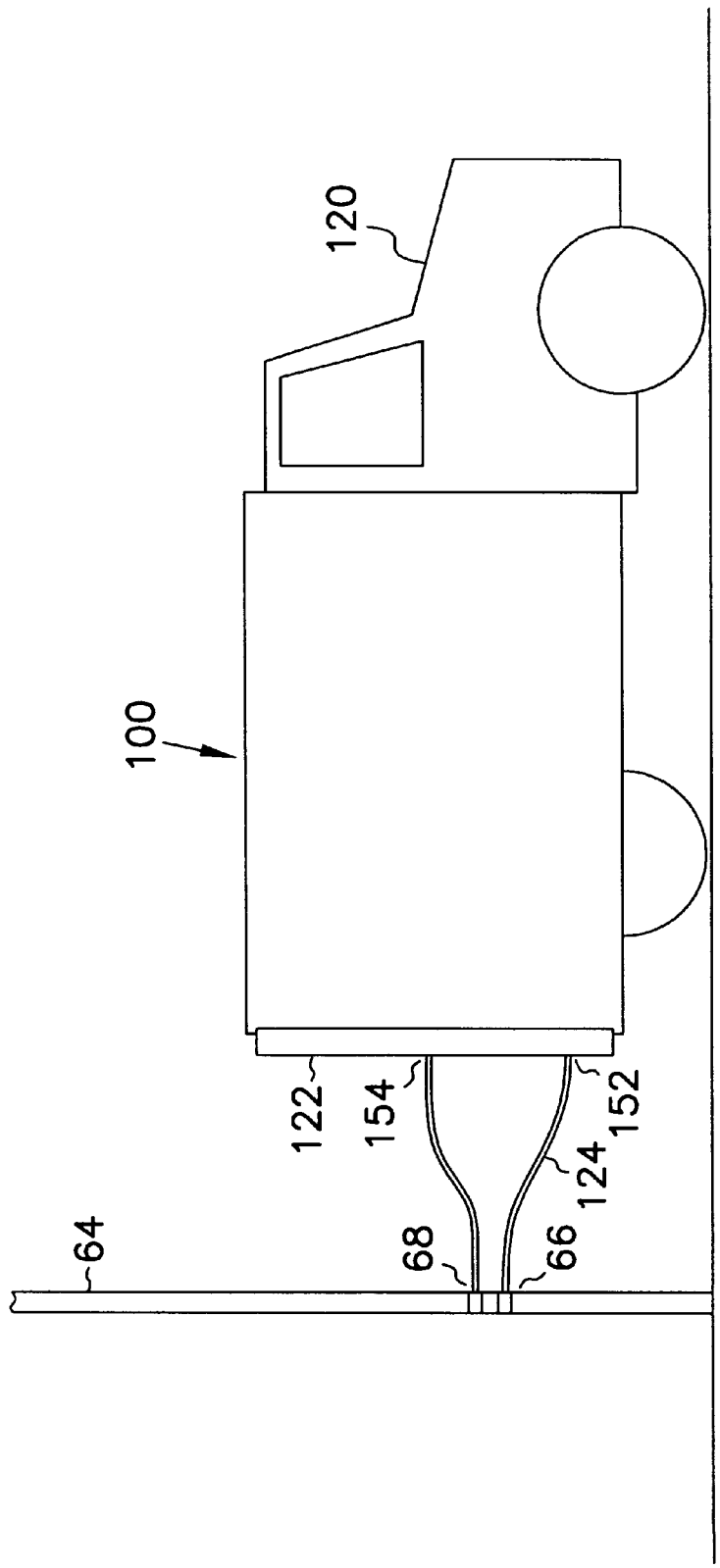
FIG. 4 is an elevation view illustrating a transport vehicle coupled with the receiving facility in accordance with one embodiment of the present invention.

The oil conduit system 130 delivers oil from the cooking oil supply container 110 to an oil delivery fitting 152 through the delivery valve 146 and the delivery pump 144 and the system 130 removes oil from the restaurant to the cooking oil waste oil container 114 through the waste oil fitting 154 and the removal valve 150. The waste oil conduit is separate from the supply oil conduit to prevent contamination of the fresh oil. The oil delivery fitting 152 and a waste oil fitting 154 are provided on an interface panel 122 on the transport vehicle 120. As illustrated in FIG. 4, the delivery and waste oil fittings 152, 154 are adapted to couple with a delivery and removal conduit 124. During delivery and removal of cooking oil, the delivery and removal conduit 124 connects the fittings 152, 154 on the transport vehicle 120 with the fittings 66, 68 at the receiving location 10. The delivery and removal conduit 124 is stored on the transport vehicle 120 during periods of non-use, such as when the transport vehicle 120 is traveling to the receiving location 10. In one embodiment, as shown in FIG. 3, delivery and removal conduit tubes 126 are provided on the transport vehicle 120 for storing the delivery and removal conduit 124. Once the delivery and removal conduit 124 is coupled with the appropriate fittings, the delivery valve 146 and the removal valve 150 are both opened. The valves 146, 150 can be automatically opened by the control device 140, or manually opened by an operator.

In addition, an oil metering device is coupled with the oil conduit system 130. In one embodiment, the oil metering device comprises fluid meters 106. The fluid meters 106 measure the amount of oil delivered to or removed from the receiving location 10 (FIG. 1). In one embodiment, a first fluid meter is disposed within the oil delivery fitting 152, and a second fluid meter is disposed within the waste oil fitting 154. One example of the first and second fluid meters 106 is a positive displacement flow meter. In another embodiment, the fluid meters 106 are provided at the receiving location 10. Alternatively, the fluid meters 106 are hand-held and transportable from one location to another. Although fluid meters 106 have been described, other types of oil metering devices can be incorporated with the cooking oil supply and transport system 100. For instance, the oil could be measured by weight.

In one embodiment, weight of the oil is measured using a load cell 118 or scale coupled with a transfer tank 116. The transfer tank 116 and the load cell 118 are provided on the transport vehicle 120. Before delivery, the oil is first placed in the transfer tank 116, and measured by the load cell 118. The load cell 118 can be coupled with the data reporting device 160 to report the amount of oil delivered. In another embodiment, a pre-measured amount of oil is placed within a single tank, and the amount of oil delivered is determined by the number of tanks emptied. Alternatively, other oil measurement devices could be used, and are considered within the scope of the invention.

A control device 140 connected within the oil conduit system 130 controls delivery and removal of cooking oil to and from the receiving location 10. The control device 140 is operative to discontinue delivery of oil upon receipt of a signal. The control device 140 includes a signal input 142 to receive the signal from the receiving location 10 and/or the transport vehicle 120 that sufficient oil has been delivered. In one embodiment, the level sensor 38 generates the signal for the control device 140, and sends the signal to the control device 140. The signal is sent to the signal input 142 via an electrical connection. Alternatively, the signal can be transmitted by other methods, as is known in the art. In another embodiment, an oil metering device, as discussed above, generates the signal for the control device 140. The level sensor 38 and the oil metering device could also act together to activate the control device 140.

To control the delivery of oil, the control device 140 is coupled with the delivery pump 144 and the delivery valve 146. Alternatively, the control device 140 can utilize the pump 144 independent of the valve 146, or the valve 146 independent of the pump 144 to control the delivery of the cooking oil. To control the removal of oil, the control device 140 is also coupled with the removal pump 148 and the removal valve 150, which can also be operated independent of one another.

During delivery of oil, upon receipt of the signal that sufficient oil has been delivered, the control device 140 ceases the delivery of oil by automatically deactivating the delivery pump 144. The control device 140 then closes the delivery valve 146. Alternatively, either the delivery pump 144 or the delivery valve 146, or both, are manually closed by the operator. The operator is alerted to close the valve 146 or turn off the delivery pump 144 by either watching a sensor, watching the fluid meter for sufficient oil delivery, watching a gauge at the receiving location, or other indicators. During removal of the waste oil, the operator notes if oil is being transferred through the delivery and removal conduit 124. When oil is no longer being transferred through the conduit 124, the removal valve 150 is manually closed by the operator.

In another embodiment, a data reporting device 160 is provided with the transport vehicle 120. In one embodiment, the data reporting device 160, which provides a delivery report, is accessible at the interface panel 122, and is disposed at a substantially low location on the panel 122 such that a person standing at ground level can reach the data reporting device with relative ease, as shown in FIG. 3. The data reporting device 160 is coupled with the first and second fluid meters 106, and receives information from the oil metering device regarding the amount of cooking oil delivered to or removed from the receiving location 10. In one embodiment, the data reporting device 160 comprises a printer. The printer prints a statement for the receiving location 10 regarding the location, time, date, and volume and/or weight of cooking oil delivered and removed to and from the receiving location 10.

Alternatively, in another embodiment, the data reporting device 160 can receive information regarding the amount of cooking oil from other metering devices besides the fluid meters 106, such as measurement devices pertaining to the weight of the cooking oil transported. The data reporting device 160 is a recording device which provides a way to protect against mistakes regarding the delivery amount and/or theft of cooking oil by employees. In yet another embodiment, the data reporting device 160 comprises a modem which transmits information regarding the delivery and removal of cooking oil, and can transfer the information to a remote location. Alternatively, the data reporting device 160 also comprises a scanner and/or a data storage device.

A method of handling and transporting bulk cooking oil to an oil receiving facility is described herein. The oil receiving facility includes, but is not limited to, locations such as restaurants which use cooking oil. The oil receiving facility has a cooking oil storage container or a supply station 30. The method comprises the steps of transporting cooking oil to the oil receiving facility 10 by a transport vehicle 120 having a cooking oil supply container 110, and establishing a connection from the vehicle cooking oil supply container 110 to the restaurant cooking oil supply container 30. The connection is established by connecting a delivery and removal conduit 124 to delivery fitting 152 provided on the vehicle and oil receiving fitting 66 at the oil receiving facility. Oil is then transferred from the vehicle cooking oil supply container 110 to the cooking oil storage container 30 at the oil receiving facility, where the amount of oil delivered is measured with a fluid meter 106. In one embodiment, a delivery report is printed based on the amount of oil measured by the fluid meter.

In another embodiment, the method of transporting cooking oil includes the step of connecting a level sensing device 38 from the cooking oil supply container 30 at the oil receiving facility 10 to the transport vehicle 120, and automatically discontinuing delivery of oil when the level sensing device 38 indicates that sufficient oil has been delivered to the supply container 30.

A method for removing waste oil is also provided. A waste oil container 114 is provided on the transport vehicle 120. A connection is established from a waste oil storage container 20 in the receiving location 10 to the waste oil container 114 on the transport vehicle 120. The connection is established by connecting a delivery and removal conduit 124 to waste oil fitting 154 provided on the vehicle and oil removal fitting 68 at the oil receiving facility 10, as shown in FIG. 4. Waste oil is then transferred from the receiving location 10 to the transport vehicle 120 for recycling.

It is to be understood that the above description is intended to be illustrative, and not restrictive. Many other embodiments will be apparent to those of skill in the art upon reviewing the above description. For instance, the supply cooking oil could be delivered independently from removal of the waste oil The scope of the invention should, therefore, be determined with reference to the appended claims, along with the full scope of equivalents to which such claims are entitled.

What is claimed is:

1. A bulk cooking oil transportation, delivery, and removal system, comprising:
   a transport vehicle, having;
      at least one cooking oil supply container;
      an oil delivery fitting for connection to deliver oil to a cooking oil using location;
      a first oil conduit system to selectively deliver oil from the cooking oil supply container to the oil delivery fitting;
      a first fluid meter connected to measure the amount of oil delivered from the cooking oil supply container to the cooking oil using location;
      at least one waste oil container;
      a waste oil receiving fitting to receive waste oil from the cooking oil using location;
      a second oil conduit system to selectively receive waste oil from the waste oil receiving fitting and to deliver the waste oil to the waste oil container;
      a second fluid meter connected to measure the amount of waste oil delivered to the waste oil container from the cooking oil using location;
      a first pump in fluid communication with the first oil conduit system whereby the first oil conduit system may deliver cooking oil to the using location; and
      a second pump in fluid communication with the second oil conduit system, whereby the second oil conduit system may remove waste oil from the using location;
   an oil receiving facility at the cooking oil using location, having:
      an oil storage container;
      an oil receiving fitting for connection to receive cooking oil for storage in the oil storage container;
      a waste oil storage container; and
      a waste oil delivery fitting for connection to remove waste oil from the waste oil storage container;
   a third oil conduit system for connection between the oil delivery fitting of the transport vehicle and the oil receiving fitting of the oil receiving facility during a filling operation; and
   a fourth oil conduit system for connection between the waste oil receiving fitting of the transport vehicle and the waste oil delivery fitting of the oil receiving facility.

2. The bulk cooking oil transportation and delivery system of claim 1 further comprising a control device.

3. The bulk cooking oil transportation and delivery system of claim 2 wherein the first pump and second pump may operate simultaneously to deliver oil to the using location and remove waste oil from the using location.

4. A system according to claim 3, wherein the oil receiving facility includes a level sensor associated with the oil storage container and operative to deliver a first signal indicating that sufficient oil is in the oil storage container, and wherein the control device includes a signal input to receive the first signal, and wherein the control device is operative to discontinue delivery of oil upon receipt of the first signal.

5. The bulk cooking oil transportation and delivery system of claim 4 further comprising a first valve operably connected to the first oil conduit system and the control device, the first valve operable to stop the flow of cooking oil on receipt of the first signal by the control device.

6. The bulk cooking oil transportation and delivery system of claim 5 further comprising a second valve operably connected to the second oil conduit system, the second valve operable to stop the flow of waste oil.

7. The bulk cooking oil transportation and delivery system of claim 6 wherein the second valve is operably connected to the control device and wherein the second valve is operable to stop the flow of waste oil on receipt of a second signal by the control device.

8. The bulk cooking oil transportation and delivery system of claim 7 further comprising:
   a transfer tank located in fluid communication with the cooking oil supply container; and
   a weight measuring device operatively connected to the transfer tank, wherein a volume of cooking oil may be transferred to the transfer tank and weighed before the oil is delivered to the receiving location.

9. The bulk cooking oil transportation and delivery system of claim 8 wherein the weight measuring device is a load cell operatively connected to the control device.

10. The system of claim 9 further including a data reporting device operatively connected to the first fluid meter for printing a statement of the amount of cooking oil delivered.

11. The system of claim 10 wherein the data reporting device is operatively connected to the second fluid meter for printing a statement of the amount of cooking oil removed.

12. A bulk cooking oil transportation, delivery, and removal system comprising:

a transport vehicle;

at least one cooking oil supply container mounted on the transport vehicle;

at least one waste oil container mounted on the transport vehicle;

an oil conduit system connected to selectively deliver oil from the cooking oil supply container to a receiving location and to selectively receive waste oil from the receiving location to the waste oil container;

an oil delivery fitting adapted to couple with the oil conduit system;

a waste oil receiving fitting adapted to couple with the oil conduit system;

a first fluid meter connected to measure the amount of oil delivered to the receiving location;

a second fluid meter operatively connected to the oil conduit system to measure the amount of waste oil received from the receiving location;

a first pump in fluid communication with the oil conduit system whereby the oil conduit system may deliver cooking oil the receiving location; and a second pump in fluid communication with the oil conduit system, whereby the oil conduit system may remove waste oil from the receiving location;

wherein the second pump may remove waste oil from the receiving location simultaneously with the first pump delivering cooking oil to the receiving location.

13. A bulk cooking oil transportation, delivery, and removal system comprising:

a transport vehicle;

at least one cooking oil supply container mounted on the transport vehicle;

at least one waste oil container mounted on the transport vehicle;

an oil conduit system connected to selectively deliver oil from the cooking oil supply container to a receiving location and to selectively receive waste oil from the receiving location to the waste oil container;

an oil delivery fitting adapted to couple with the oil conduit system;

a waste oil receiving fitting adapted to couple with the oil conduit system;

a transfer tank located in fluid communication with the cooking oil supply container;

a weight measuring device operatively connected to the transfer tank, wherein a volume of cooking oil may be transferred to the transfer tank and weighed before the oil is delivered to the receiving location;

a first pump in fluid communication with the oil conduit system whereby the oil conduit system may deliver cooking oil to the receiving location; and a second pump in fluid communication with the oil conduit system, whereby the oil conduit system may remove waste oil from the receiving location;

wherein the second pump may remove waste oil from the receiving location simultaneously with the first pump delivering cooking oil to the receiving location.

\* \* \* \* \*

UNITED STATES PATENT AND TRADEMARK OFFICE
CERTIFICATE OF CORRECTION

PATENT NO.: 5,964,258

DATED: Oct. 12, 1999

INVENTOR(S): Schoenbauer

It is certified that error appears in the above-identified patent and that said Letters Patent is hereby corrected as shown below:

In column 9, line 35, insert -- to -- Before "the".

Signed and Sealed this

Twelfth Day of December, 2000

Attest:

Q. TODD DICKINSON

*Attesting Officer*    *Director of Patents and Trademarks*